A. PHILIPPI.
Drive Chain.

No. 232,060.  Patented Sept. 7, 1880.

Witnesses:
Nat. E. Oliphant,
Geo. R. Porter.

Inventor.
Alexander Philippi,
per Chas. H. Fowler,
Attorney.

UNITED STATES PATENT OFFICE.

ALEXANDER PHILIPPI, OF ST. LOUIS, MISSOURI.

DRIVE-CHAIN.

SPECIFICATION forming part of Letters Patent No. 232,060, dated September 7, 1880.

Application filed December 2, 1879.

*To all whom it may concern:*

Be it known that I, ALEXANDER PHILIPPI, of St. Louis, in the State of Missouri, have invented a new and valuable Improvement in Drive-Chains; and I do hereby declare that the following is a full, clear, and exact description of the construction and operation of the same, reference being had to the annexed drawings, making a part of this specification, and to the letters and figures of reference marked thereon.

Figure 1:
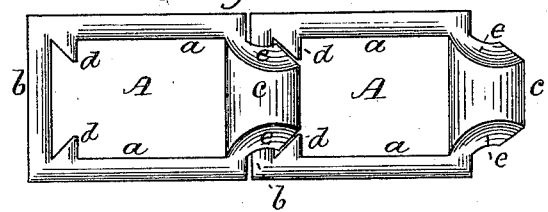
Figure 2:
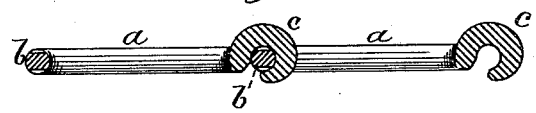
Figure 3:
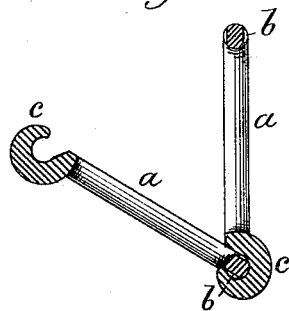
Figure 4:
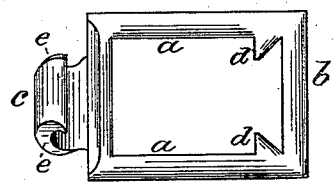

Figure 1 of the drawings is a representation of two links coupled together constructed in accordance with my invention. Fig. 2 is a longitudinal vertical section of the same. Fig. 3 is a view of the links, partly in section, showing them in position for coupling. Fig. 4 is a plan view of one of the links.

The present invention has relation to links for that class of chains termed "drive-chains," and has for its object to produce a chain of the above character in which the several links are of such construction as will admit of being readily and securely held together to prevent them from accidental displacement, as will be hereinafter described, and subsequently pointed out in the claims.

In the accompanying drawings, A represents two links constructed according to my invention and coupled together. Each link is composed of two parallel side bars, $a$, and cross-bar $b$ of an oblong or elliptical form. The other end of the link, or that portion opposite the cross-bar $b$, terminates in a hook, $c$, and from the side bars, $a$, near the cross-bar $b$ and upon the inner sides thereof, project beveled lugs $d$.

In coupling the links together the oblong or elliptical shape of the cross-bar $b$, with the corresponding form of the interior of the hook C, require the links to be brought at a right angle, or nearly so, to each other before the cross-bar will freely enter the hook, after which the links may be brought on the same horizontal plane.

The hooks $c$, upon their outer sides, are beveled, as shown at $e$, this incline or bevel portion passing under the bevel-faces of the lugs $d$, or, in other words, in the spaces formed by the beveled lugs and the inner portion of the cross-bar $b$. The lugs $d$ and the dovetail form of the hook $c$ together form a very secure connection between the several links, the lugs $d$ preventing the possibility of lateral displacement, and as the peculiar form of the cross-bar, together with the corresponding form of the hook upon its interior face, require the links to be brought at right angles to each other in order to be coupled, it will therefore be necessary to bring them at the same position for uncoupling.

Having now fully described my invention, what I claim as new, and desire to secure by Letters Patent, is—

1. An open chain-link the side bars of which have beveled lugs projecting from their inner sides and a corresponding hook at the opposite end of the link, substantially as and for the purpose set forth.

2. A chain-link having the beveled or inclined lugs $d$ on the side bars, and the hook $c$ at one end of the link, having beveled sides $e$, substantially as and for the purpose specified.

In testimony that I claim the above I have hereunto subscribed my name in the presence of two witnesses.

ALEXANDER PHILIPPI.

Witnesses:
JOHN B. ROEDER,
W. C. RITCHIE.